(12) United States Patent
Lee et al.

(10) Patent No.: US 12,728,771 B2
(45) Date of Patent: Sep. 8, 2026

(54) SEAT CONTROL APPARATUS AND METHOD

(71) Applicants: HYUNDAI MOTOR COMPANY, Seoul (KR); KIA CORPORATION, Seoul (KR)

(72) Inventors: Dong Hoon Lee, Hwaseong-si (KR); Mun Seung Kang, Suwon-si (KR); Kug Hun Han, Seoul (KR); Yo Han Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 114 days.

(21) Appl. No.: 18/638,032

(22) Filed: Apr. 17, 2024

(65) Prior Publication Data

US 2025/0162469 A1 May 22, 2025

(30) Foreign Application Priority Data

Nov. 16, 2023 (KR) ........................ 10-2023-0159402

(51) Int. Cl.
*B60N 2/02* (2006.01)
*B60N 2/00* (2006.01)

(52) U.S. Cl.
CPC ......... *B60N 2/0252* (2013.01); *B60N 2/0025* (2023.08); *B60N 2/0273* (2023.08)

(58) Field of Classification Search
None
See application file for complete search history.

(56) References Cited

U.S. PATENT DOCUMENTS

2002/0125848 A1* 9/2002 Schober ................. B60J 7/0573 318/625
2018/0223587 A1* 8/2018 Spangler ............. B60R 25/2054

* cited by examiner

*Primary Examiner* — Lail A Kleinman
(74) *Attorney, Agent, or Firm* — Lempia Summerfield Katz LLC

(57) ABSTRACT

A seat control apparatus includes an input device, a driving device, a memory that stores one or more instructions, and a controller operatively connected to the input device, the driving device, and the memory. The controller is configured to execute the one or more instructions to receive a specified input regarding a location control of a seat through the input device. The controller is also configured to identify an output current required for controlling the seat from a current state to a target state corresponding to the specified input by using the driving device. The controller is also configured to determine an operation sequence of one or more motors included in the driving device, based on the output current. The controller is also configured to control the seat to the target state by using the driving device, based on the determined operation sequence.

20 Claims, 6 Drawing Sheets

SEAT CONTROL APPARATUS AND METHOD

CROSS-REFERENCE TO RELATED APPLICATION

This application claims the benefit of and priority to Korean Patent Application No. 10-2023-0159402, filed in the Korean Intellectual Property Office on Nov. 16, 2023, the entire contents of which are incorporated herein by reference.

TECHNICAL FIELD

The present disclosure relates to a seat control apparatus and method for efficiently controlling at least one seat included in a host vehicle to a target state.

BACKGROUND

As technology advances, various components in an interior of a vehicle may be operatively connected to each other. In particular, a seat control apparatus may quickly and accurately provide various functions by performing cooperative controls between the components for convenience of users.

For example, the host vehicle may include a seat that may be moved (e.g., slid) forwards and rearwards in a fully automatic manner with respect to a front side. The seat may be automatically moved to a specified location when a situation such as a single user input (e.g., a switch input) and/or occurrence of a specified event (e.g., a door opening or closing situation) is identified.

For example, if receiving specified input from the user, the seat control apparatus may control a state of a seat to a target state corresponding to the specified input. In this case, the seat control apparatus may operate one or more motors (or driving devices) provided for a location control of the seat at the same or different times.

Meanwhile, there may be a limit in an output current, which may be used to allow the seat control apparatus to control the driving device. Accordingly, the seat control apparatus may have to sequentially control the one or more motors included in the driving device in a range of a maximum available current. Due to the limitations, a control time period for the seat control becomes longer, and users may feel uncomfortable.

The statements in this section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides a seat control apparatus that determines an operation sequence of the motors based on the output currents for the motors of the driving devices, which are required for controlling the seat to the target state corresponding to the specified input when receiving a specified input from the user.

An aspect of the present disclosure also provides a seat control apparatus that, when identifying that a user is seated on a seat, identifies the output current by using the body information of the user and determines the operation sequence based on this.

An aspect of the present disclosure also provides a seat control apparatus that identifies the required current of the respective motors and groups the motors into at least one or more motor groups based on the comparison between the identified required currents and the available maximum output current that may be used by the seat control apparatus.

In, an aspect of the present disclosure, in a process of controlling the first motor group identified as having the first priority in the operation sequence, once an operation of at least one motor included in the first motor group is completed, the seat control apparatus may efficiently and quickly control the seat to the target state by preferentially starting an operation of at least one motor included in another motor group having the next priority.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a seat control apparatus includes an input device, a driving device, a memory that stores one or more instructions, and a controller operatively connected to the input device, the driving device, and the memory. The controller is configured to execute the one or more instructions to receive a specified input regarding a location control of a seat through the input device. The controller may also identify an output current required for controlling the seat from a current state to a target state corresponding to the specified input by using the driving device. The controller may also determine an operation sequence of one or more motors included in the driving device, based on the output current. The controller may also control the seat to the target state by using the driving device, based on the determined operation sequence.

According to an embodiment, the controller may also identify required current of the one or more motors, which are required for controlling the target state. The controller may also group the one or more motors based on the required current. The controller may also sequentially control the grouped one or more motors for respective groups, based on the operation sequence.

According to an embodiment, the controller may also identify a maximum current to be output, a first required current of a first motor, a second required current of a second motor group, or any combination thereof when an operation of the first motor included in a first motor group corresponding to a first priority is completed in a process of controlling the first motor group. The controller may also start controlling the second motor group when it is identified that the second motor group is to be further controlled while the first motor group, except for the first motor, is controlled, based on the maximum current, the first required current, and the second required current.

According to an embodiment, the controller may also identify, among a plurality of motor groups, a motor group having a highest priority according to the operation sequence, as the second motor group.

According to an embodiment, the controller may also identify, among the plurality of motor groups, a motor group having a smallest movement amount, by which the seat is to be moved for controlling the target state, as the second motor group.

According to an embodiment, the controller may also identify a new output current corresponding to a passenger seating situation based on a weight of a user in response to a determination that the user is seated on the seat. The controller may also determine the operation sequence based on the new output current.

According to an embodiment, the seat control apparatus may further include a sensor device. The controller may also identify biometric information of a user seated on the seat, by using the sensor device. The controller may also determine the operation sequence further based on the biometric information.

According to an embodiment, the seat control apparatus may further include an output device. The controller may also determine the operation sequence to preferentially control, among the one or more motors, a motor having a higher required current required for controlling the target state, in response to a determination that the user is sleeping, based on the biometric information.

According to another aspect of the present disclosure, a seat control method includes receiving, by a controller, a specified input regarding a location control of a seat through an input device. The seat control method also includes identifying, by the controller, an output current required for controlling the seat from a current state to a target state corresponding to the specified input by using a driving device. The seat control method also includes determining, by the controller, an operation sequence of one or more motors included in the driving device, based on the output current. The seat control method also includes controlling the seat to the target state by using the driving device, based on the determined operation sequence.

According to an embodiment, the seat control method may further include identifying, by the controller, required current of the one or more motors, which are required for controlling the target state. The seat control method also includes grouping, by the controller, the one or more motors based on the required current. The seat control method also includes sequentially controlling, by the controller, the grouped one or more motors for respective groups, based on the operation sequence.

According to an embodiment, the seat control method may further include identifying, by the controller, a maximum current to be output, a first required current of a first motor, a second required current of a second motor group, or any combination thereof when an operation of the first motor included in a first motor group corresponding to a first priority is completed in a process of controlling the first motor group. The seat control method may further include starting, by the controller, controlling the second motor group in response to a determination that the second motor group is to be further controlled while the first motor group, except for the first motor, is controlled, based on the maximum current, the first required current, and the second required current.

According to an embodiment, the seat control method may further include identifying, by the controller, among a plurality of motor groups, a motor group having a highest priority according to the operation sequence, as the second motor group.

According to an embodiment, the seat control method may further include identifying, by the controller, among the plurality of motor groups, a motor group having a smallest movement amount, by which the seat is to be moved for controlling the target state, as the second motor group.

According to an embodiment, the seat control method may further include identifying, by the controller, a new output current corresponding to a passenger seating situation based on a weight of a user in response to a determination that the user is seated on the seat. The seat control method may further include determining, by the controller, the operation sequence based on the new output current.

According to an embodiment, the seat control method may further include identifying, by the controller, biometric information of a user seated on the seat, by using the sensor device. The seat control method may further include determining, by the controller, the operation sequence further based on the biometric information.

According to another aspect of the present disclosure, there is a computer readable recording medium including a program for executing a seat control method. The seat control method includes receiving, by the controller, a specified input regarding a location control of a seat through an input device. The seat control method includes identifying, by the controller, an output current required for controlling the seat from a current state to a target state corresponding to the specified input by using a driving device. The seat control method also includes determining, by the controller, an operation sequence of one or more motors included in the driving device, based on the output current. The seat control method also includes controlling, by the controller, the seat to the target state by using the driving device, based on the determined operation sequence.

According to an embodiment, the seat control method may further include identifying, by the controller, required current of the one or more motors, which are required for controlling the target state. The seat control method may further include grouping, by the controller, the one or more motors based on the required current. The seat control method may further include sequentially controlling, by the controller, the grouped one or more motors for respective groups, based on the operation sequence.

According to an embodiment, the seat control method may further include identifying, by the controller, a maximum current to be output, a first required current of a first motor, a second required current of a second motor group, or any combination thereof when an operation of the first motor included in a first motor group corresponding to a first priority is completed in a process of controlling the first motor group. The seat control method may further include starting, by the controller, controlling the second motor group in response to a determination that the second motor group is to be further controlled while the first motor group, except for the first motor, is controlled, based on the maximum current, the first required current, and the second required current.

According to an embodiment, the seat control method may further include identifying, by the controller, among a plurality of motor groups, a motor group having a highest priority according to the operation sequence, as the second motor group.

According to an embodiment, the seat control method may further include identifying, by the controller, among the plurality of motor groups, a motor group having a smallest movement amount, by which the seat is to be moved for controlling the target state, as the second motor group.

BRIEF DESCRIPTION OF THE DRAWINGS

The above and other objects, features, and advantages of the present disclosure should be more apparent from the following detailed description taken in conjunction with the accompanying drawings.

In relation to a description of the drawings, the same or similar reference numerals may denote the same or similar components.

DETAILED DESCRIPTION

Figure 1:
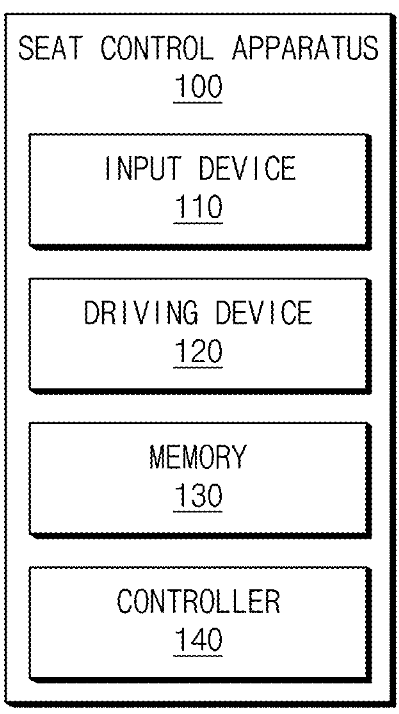
FIG. 1 is a block diagram illustrating components of a seat control apparatus according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, “A”, “B”, (a), (b), and the like may be used. These terms are merely intended to distinguish one component from another component, and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art. The terms should not be interpreted as having ideal or excessively formal meanings unless clearly defined as having such in the present application. When a component, device, element, or the like of the present disclosure is described as having a purpose or performing an operation, function, or the like, the component, device, element, or the like should be considered herein as being “configured to” meet that purpose or to perform that operation or function. Each of the component, device, element, and the like may separately embody or be included with a processor and a memory, such as a non-transitory computer readable media, as part of the apparatus.

Hereinafter, embodiments of the present disclosure are described in detail with reference to FIGS. 1-6.

FIG. 1 is a block diagram illustrating components of a seat control apparatus according to an embodiment of the present disclosure.

According to an embodiment, a seat control apparatus 100 may include at least one of an input device 110, a driving device 120, a memory 130, a controller 140, or any combination thereof. A configuration of the seat control apparatus 100 illustrated in FIG. 1 is illustrative, and the embodiments of the present disclosure are not limited thereto. For example, the seat control apparatus 100 may further include components (e.g., at least one of a sensor device, an interface, a communication device, a notification device, or any combination thereof) that are not illustrated in FIG. 1.

According to an embodiment, the input device 110 may include at least one input device that receives a user input for some of the components of a host vehicle.

For example, the input device 110 may include at least one of at least one switch, a touch screen, a voice acquisition device, or any combination thereof.

For example, the input device 110 may be disposed in an area of at least one seat, a center fascia, a back of an assistant seat, and/or an area of the trunk.

For example, the input device 110 may receive a location control input for at least some of a plurality of seats in the host vehicle, from a user.

As an example, if receiving a pressure input on a switch, a touch input on a touch screen, and/or a voice input on a voice acquisition device from the user, the seat control apparatus 100 may perform a seat location control corresponding to the corresponding input.

As an example, the seat control apparatus 100 may receive a specified input regarding a location control of a specific seat from the user through the input device 110. The specified input, for example, may include a user input for requesting to control a location of the seat to a state that is predefined by the user or a specific state corresponding to the input device 110.

According to an embodiment, the driving device 120 may be configured to adjust the location of the seat.

For example, the driving device 120 includes at least one driving device (e.g., at least one motor) that adjusts at least one of a reclining angle, a slide location, a headrest angle, a leg rest angle, a swivel angle of the seat, or any combination thereof.

For example, the controller 140 may control a state of the seat to a target state corresponding to the specified input by using the driving device 120. The target state may be, for example, a state that is set by the user.

According to an embodiment, the memory 130 may store commands or data. For example, the memory 130 may store one or more instructions that, when being executed by the controller 140, cause the seat control apparatus 100 to perform various operations.

For example, the memory 130 and the controller 140 may be implemented as one chipset. The controller 140 may include at least one of a communication processor or a modem.

For example, the memory 130 may store various information on the user. For example, the memory 130 may store body information (e.g., a weight, a height, a length of the upper body, or a length of the lower body) of the user. The controller 140 may identify whether the passenger seated on the seat is the user based on the body information of the user, which is stored in the memory 130.

According to an embodiment, the controller 140 may be operatively connected to at least one of the input device 110, the driving device 120, the memory 130, or any combination thereof. For example, the controller 140 may control an operation of at least one of the input device 110, the driving device 120, the memory 130, or any combination thereof.

For example, the controller 140 may receive a specified input regarding a location control of the seat by using the input device 110.

As an example, the controller 140 may receive a specified input based on various types of input devices (e.g., switches or touch buttons) included in the input device 110.

For example, the controller 140 may identify an output current required for controlling the seat from a current state to a target state corresponding to the specified input by using the driving device 120.

As an example, the controller 140 may identify the output current required for control the seat to the target state. The output current, for example, may be applied to the driving device 120, and may be a control parameter that is required for an operation of the driving device 120.

As an example, the controller 140 may identify the required currents of one or more motors included in the driving device 120. For example, the controller 140 may identify the required currents of the one or more motors required for controlling the seat from the current state to the target state.

For example, the controller 140 may determine an operation sequence of the one or more motors included in the driving device 120 based on the output current. The controller 140 may sequentially control one or more grouped motors for the respective groups based on the operation sequence.

As an example, the controller 140 may group the one or more motors based on magnitudes of the required currents of the one or more motors. For example, the one or more motors may be grouped according to a preset scheme.

As an example, the controller 140 may determine the operation sequence for the plurality of grouped motor groups. For example, the controller 140 may determine the operation sequence for the plurality of motor groups based on at least one of a sum of the required currents of the motors that are to be included in the group, a sum of the required time periods that are required for performing a control until the target state, or any combination thereof. For example, the controller 140 may determine the operation sequence such that the required time period is the smallest.

For example, the controller 140 may control the seat to the target state by using the driving device 120, based on the determined operation sequence.

As an example, the controller 140 may sequentially control the one or more grouped motors for the respective groups based on the determined operation sequence.

As an example, the controller 140 may preferentially control a first motor group corresponding to a first priority. The first motor group may include first, second, and third motors. For example, the controller 140 may identify, among the plurality of motor groups, a motor group of the highest priority according to the operation sequence as a second motor group. For example, the controller 140 may identify, among the plurality of motor groups, a motor group of the highest priority according to the predefined operation sequence as the second motor group. As another example, the controller 140 may identify, among the plurality of motor groups, a motor group of the shortest movement amount, by which the seat is to be moved to control the seat to the target state, as the second motor group. In other words, the controller 140 may identify, among the plurality of motor groups, a motor group of the shortest (or smallest) movement amount (or the required current) as the second motor group.

As an example, when the first motor is completed in a process of controlling the first motor group, the controller 140 may identify at least one of a maximum current that may be output, a first required current of the first motor, a second required current of the second motor group, or any combination thereof may be identified.

As an example, the controller 140 may identify whether the second motor group (or the one or more motors included in the second motor group) may be further controlled while controlling the first motor group (e.g., the second motor and the third motor), except for the first motor, based on the identified information. For example, the controller 140 may identify that the second motor group may be further controlled when a sum of the required currents of the second motor and the third motor and the required current of the second motor group is less than or equal to the maximum output current.

For example, when identifying that the second motor group may be controlled, the controller 140 may start controlling the second motor group while operating the second motor and the third motor. In other words, the controller 140 may simultaneously operate the second motor group together with the second motor and the third motor. Through this, the controller 140 may control the seat to the target state in a way that minimizes a surplus time period.

For example, the controller 140 may identify an output current and an operation sequence differently depending on whether the user is seated on the seat.

For example, if identifying that the user is seated on the seat, the controller 140 may identify a new output current corresponding to the passenger seating situation based on the weight of the user. In other words, because more output currents may be required for a specific motor (e.g., a motor for a slide location control) for controlling the driving device 120 when the passenger is seated on the seat, the controller 140 may identify a new output current. For example, the controller 140 may determine the operation sequence based on the new output current again.

For example, the controller 140 may determine the operation sequence differently depending on a state of the user who is seated on the seat.

As an example, the controller 140 may identify biometric information of the user who is seated on the seat by using the sensor device. The biometric information, for example, may include information on at least one of whether the user is sleeping, an emotional state of the user, a sitting posture, or any combination thereof.

For example, the controller 140 may determine the operation sequence based on the biometric information. For example, if identifying that the user is sleeping based on the biometric information, the controller 140 may determine the operation sequence to preferentially control, among the one or more motors, a motor of a higher required current that is required for controlling it to the target state. Through this, the seat control apparatus 100 may allow the sleeping user to remain seated comfortably.

The components of the seat control apparatus 100 illustrated in FIG. 1 are illustrative and the embodiments in the present disclosure are not limited thereto. For example, the seat control apparatus 100 may further include at least one of the sensor device, the communication device, the interface, or any combination thereof.

According to an embodiment, the sensor device may include at least one sensor that acquires (or identifies) various information in driving state of the host vehicle and/or a state of the seat.

For example, the sensor device may acquire information on the driving state of the host vehicle. The driving information, for example, may include information on an autonomous driving control.

For example, the sensor device may include at least one sensor (e.g., at least one of a passenger detection sensor, a pressure sensor, a camera, or any combination thereof) that identifies whether a user is seated on a seat included in the host vehicle. The controller 140, for example, may identify whether the user is seated on each seat included in the host vehicle in real-time by using at least one sensor. For example, the controller 140 may identify the information on the user who is seated on the seat (e.g., a weight of the user).

Figure 2:
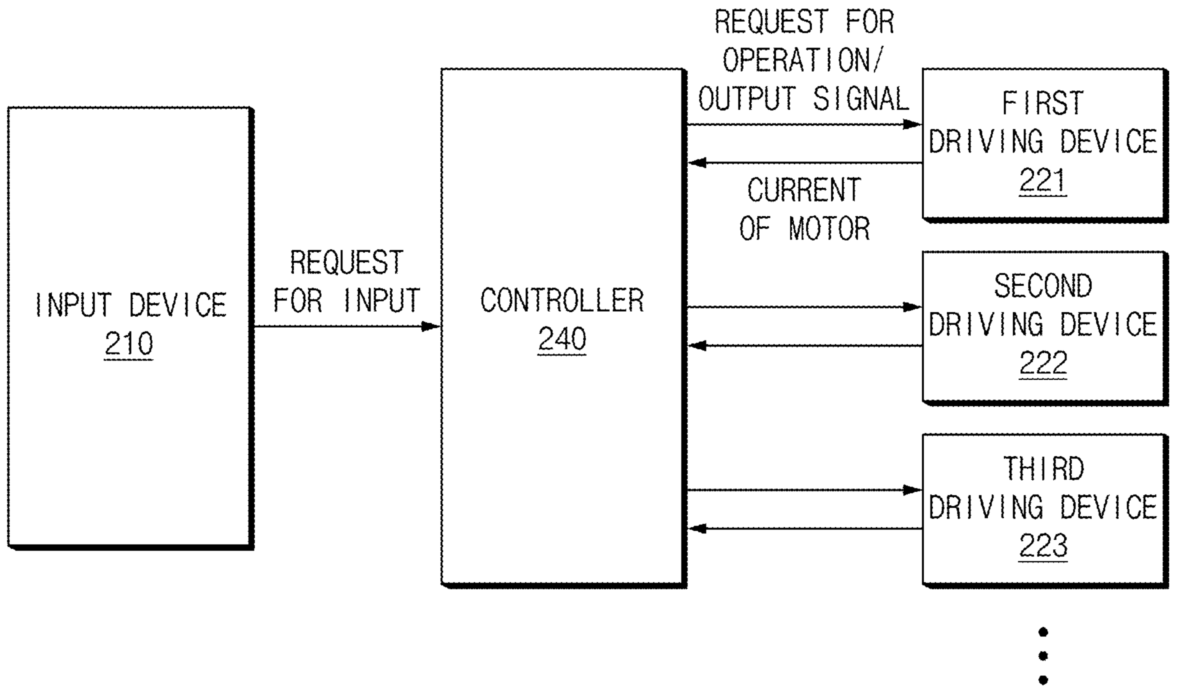
FIG. 2 is a block diagram illustrating components of a seat control apparatus according to an embodiment of the present disclosure.

FIG. 2 is a block diagram illustrating components of a seat control apparatus according to an embodiment of the present disclosure.

According to an embodiment, the seat control apparatus (e.g., the seat control apparatus 100 of FIG. 1) includes an input device 210, a first driving device 221, a second driving device 222, and a third driving device 223, a controller 240 (e.g., the controller 140 of FIG. 1), or any combination thereof.

For example, although it is illustrated that the first driving device 221, the second driving device 222, and the third driving device 223 are independently distinguished components, but they may be integrated and implemented as a one device (e.g., the driving device 120 FIG. 1). The first driving device 221, the second driving device 222, and the third driving device 223 may include a motor.

For example, the controller 240 may receive a request for an input from the user through the input device 210. As an example, the request for an input may include a request for controlling the seat to the target state.

For example, the controller 240 may control the seat to the target state by using the first driving device 221, the second driving device 222, and the third driving device 223.

For example, the controller 140 may deliver a request for an operation and an output signal to at least one driving device required for controlling one of the first driving device 221, the second driving device 222, and the third driving device 223 to the target state.

For example, the first driving device 221, the second driving device 222, and the third driving device 223 may deliver a motor current required for being operated to the target state to the controller 240.

For example, the controller 240 may identify the required current of each of the first driving device 221, the second driving device 222, and the third driving device 223 and may determine an operation sequence based on a magnitude of the required current.

The driving devices illustrated in FIG. 2 are illustrative, and the seat control apparatus may further include other driving devices that are not illustrated.

Figure 3:
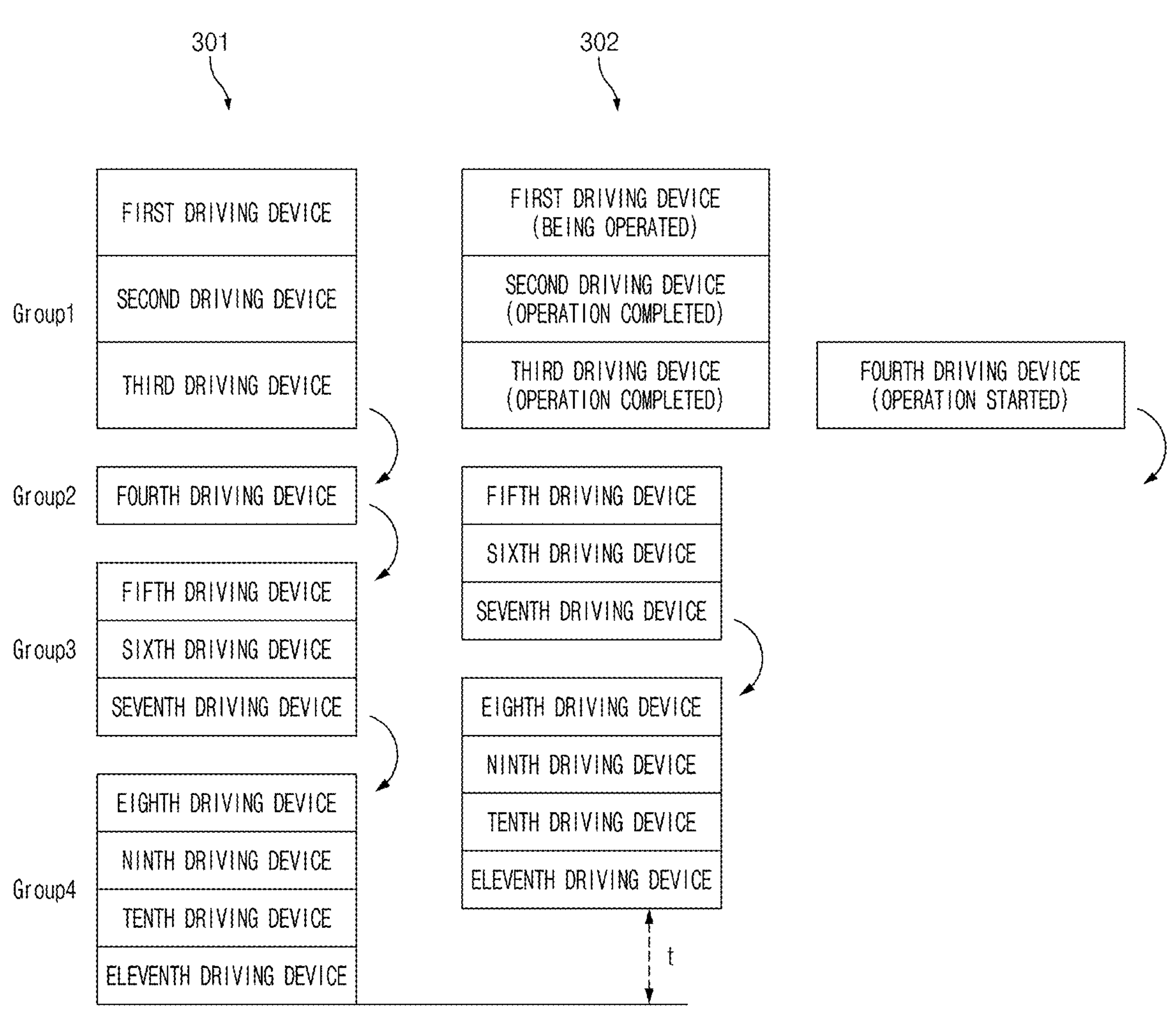
FIG. 3 is an operational conceptual view illustrating a sequence, in which a seat control apparatus operates a driving device, according to an embodiment of the present disclosure.

FIG. 3 is an operational conceptual view illustrating a sequence, in which a seat control apparatus operates a driving device according to an embodiment of the present disclosure.

According to an embodiment, the seat control apparatus (e.g., the seat control apparatus 100 of FIG. 1) may control a location of a seat by using a driving device (e.g., the driving device 120 of FIG. 1) including first to eleventh driving devices. For example, the first to eleventh driving devices may include at least one of a foot rest control motor, a leg rest control motor, a slide location control motor, a reclining motor, a tilting motor, a height control motor, a cushion control motor, a headrest control motor, or any combination thereof.

For example, the seat control apparatus may identify a plurality of motor groups depending on a result of grouping one or more driving devices.

For example, the seat control apparatus may identify the first driving device, the second driving device, and the third driving device by classifying them as a first motor group.

For example, the seat control apparatus may distinguish and identify the fourth driving device as the second motor group.

For example, the seat control apparatus may distinguish and identify the fifth driving device, the sixth driving device, and the seventh driving device as the third motor group.

For example, the seat control apparatus may distinguish and identify the eighth driving device, the ninth driving device, the tenth driving device, and the eleventh driving device as the second motor group.

According to an embodiment, reference numeral 301 is an operational conceptual view, in which the seat control apparatus performs a seat control based on an operation sequence for each of the grouped driving devices.

For example, the seat control apparatus may preferentially operate a first motor group corresponding to a first priority. Thereafter, a second motor group corresponding to a second priority, a third motor group corresponding to a third priority, and a fourth motor group corresponding to a fourth priority may be operated sequentially.

The seat control apparatus according to reference numeral 301 may start an operation of the second motor group, which is the next priority after all the motors included in the first motor group have completed operations thereof.

According to an embodiment, reference numeral 302 is an operational conceptual view of, by the seat control apparatus, performing a seat control based on the operation sequence of the driving devices and efficiently performing a seat control in consideration of a maximum output current that may be output and the required current of each of the motor groups.

For example, the seat control apparatus may preferentially operate the first motor group corresponding to the first priority. Then, when the operations of, among the motors included in the first motor group, the second driving device and the third driving device are completed, the seat control apparatus may identify whether the second motor group, which is the next priority, may be operated.

For example, when the operations of the second driving device and the third driving device are completed, the seat control apparatus may identify whether a sum of a required current of the first driving device, which is the remaining motor, and a required current of the second motor group (or the fourth driving device) is not more than a maximum current that may be output. When the sum of the required current of the first driving device and the required current of the second motor group (or the fourth driving device) is not more than the maximum current that may be output, the seat control apparatus may operate the fourth driving device while operating the first driving device together.

For example, the seat control apparatus may sequentially operate the second motor group corresponding to the second priority, the third motor group corresponding to the third priority, and the fourth motor group corresponding to the fourth priority.

Based on an operation protocol according to reference numeral 302, the seat control apparatus may save an operation time period by a time period of "t" as compared to an operation protocol according to reference numeral 301.

Figure 4:
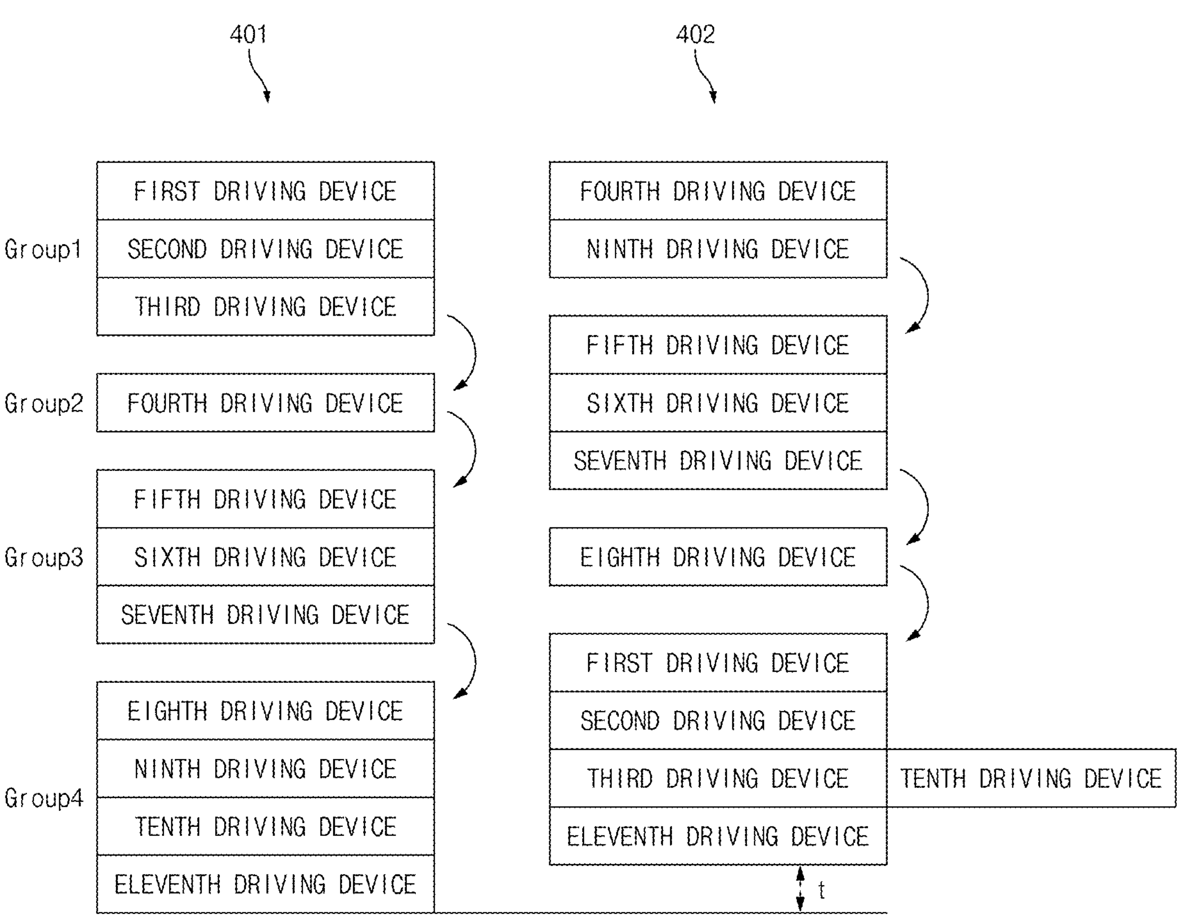
FIG. 4 is an operational conceptual view illustrating a sequence, in which a seat control apparatus operates a driving device, according to an embodiment of the present disclosure.

FIG. 4 is an operational conceptual view illustrating a sequence, in which the seat control apparatus operates the driving device according to an embodiment of the present disclosure.

According to an embodiment, the seat control apparatus (e.g., the seat control apparatus 100 of FIG. 1) may control the location of the seat by using driving devices (e.g., the driving device 120 of FIG. 1) including first to eleventh driving devices. For example, the first to eleventh driving devices may include at least one of a foot rest control motor, a leg rest control motor, a slide location control motor, a reclining motor, a tilting motor, a height control motor, a cushion control motor, a headrest control motor, or any combination thereof.

For example, the seat control apparatus may identify the plurality of motor groups according to the result of grouping one or more driving devices.

Referring to reference numeral 401, according to an embodiment, the seat control apparatus may classify and identify the first driving device, the second driving device, and the third driving device into the first motor group, the fourth driving device into the second motor group, the fifth driving device, the sixth driving device, and the seventh driving device into the third motor group, and the eighth driving device, the ninth driving device, the tenth driving device, and the eleventh driving device into the fourth motor group.

Thereafter, the seat control apparatus may identify the motor groups and the required currents of the motors included in the motor groups. The seat control apparatus may perform grouping again in a direction that may shorten a control time period, based on the identified required currents and the maximum current that may be output.

Referring to reference numeral 402, according to an embodiment, the seat control apparatus may classify and identify the fourth driving device and the ninth driving device into the first motor group, and the fifth driving device, the sixth driving device, and the seventh driving device into the second motor group, the eighth driving device into the third motor group, and the first driving device, the second driving device, the third driving device, and the eleventh driving device into the fourth motor group.

For example, if the operation of the first driving device, the second driving device, and the eleventh driving device are completed in a process of operating the fourth motor group, the seat control apparatus whether the third driving device and the tenth driving device may be simultaneously operated. If identifying that they may be operated simultaneously, the seat control apparatus may simultaneously operate the third driving device and the tenth driving device that is the next priority. Through this, the seat control apparatus may save the control time period by the time period of "t" as compared to the embodiment according to reference numeral 401.

Figure 5:
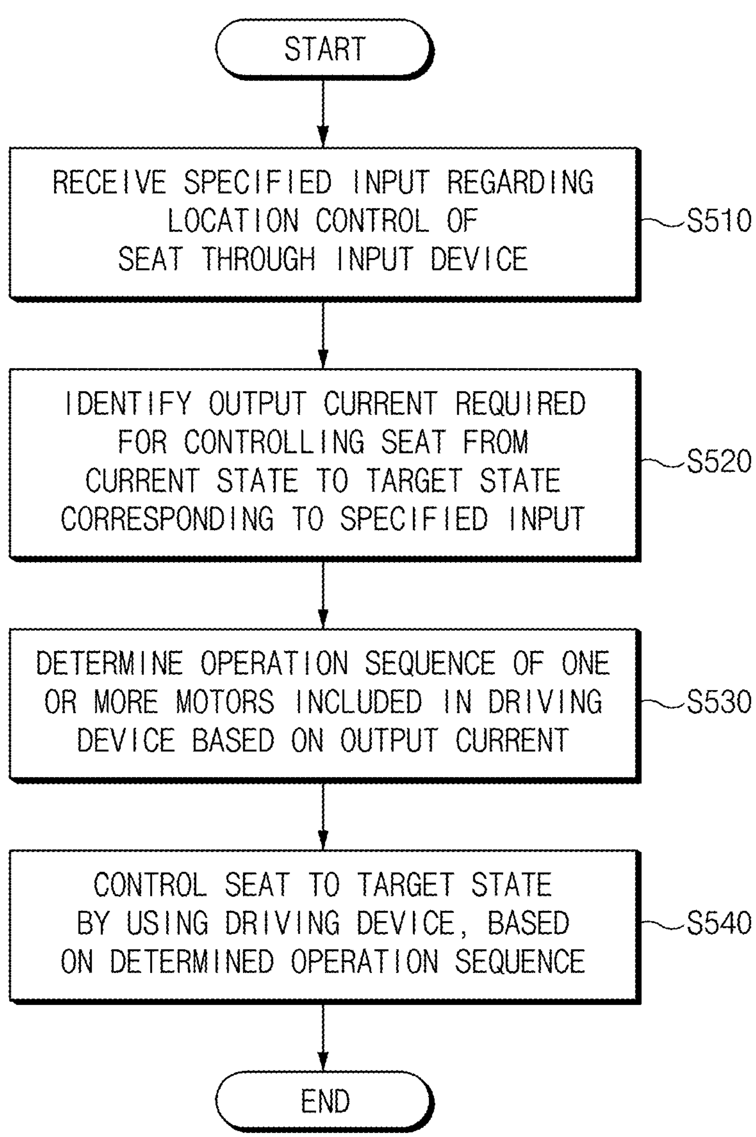
FIG. 5 is a flowchart of a seat control method according to an embodiment of the present disclosure.

FIG. 5 is a flowchart of a seat control method according to an embodiment of the present disclosure.

According to an embodiment, a seat control apparatus (e.g., the seat control apparatus 100 of FIG. 1) may perform operations disclosed in FIG. 5. For example, at least some of the components included in the seat control apparatus (e.g., the input device 110, driving device 120, memory 130, or controller 140 of FIG. 1) may be configured to perform the operation of FIG. 5.

In the following embodiment, operations S510 to S540 may be performed sequentially but are not necessarily performed sequentially. For example, a sequence of the operations may be changed, and at least two operations may be performed in parallel. Furthermore, contents that correspond to or overlap the contents described above with respect to FIG. 5 may be briefly described or omitted.

According to an embodiment, the seat control apparatus may receive a specified input regarding a location control of the seat through the input device (S510).

According to an embodiment, an output current that is required for controlling the seat from the current state to the target state corresponding to the specified input may be identified (S520).

According to an embodiment, the seat control apparatus may determine an operation sequence of the one or more motors included in the driving device based on an output current (S530).

According to an embodiment, the seat control apparatus may control the seat to the target state by using the driving device based on the determined operation sequence (S540).

Figure 6:
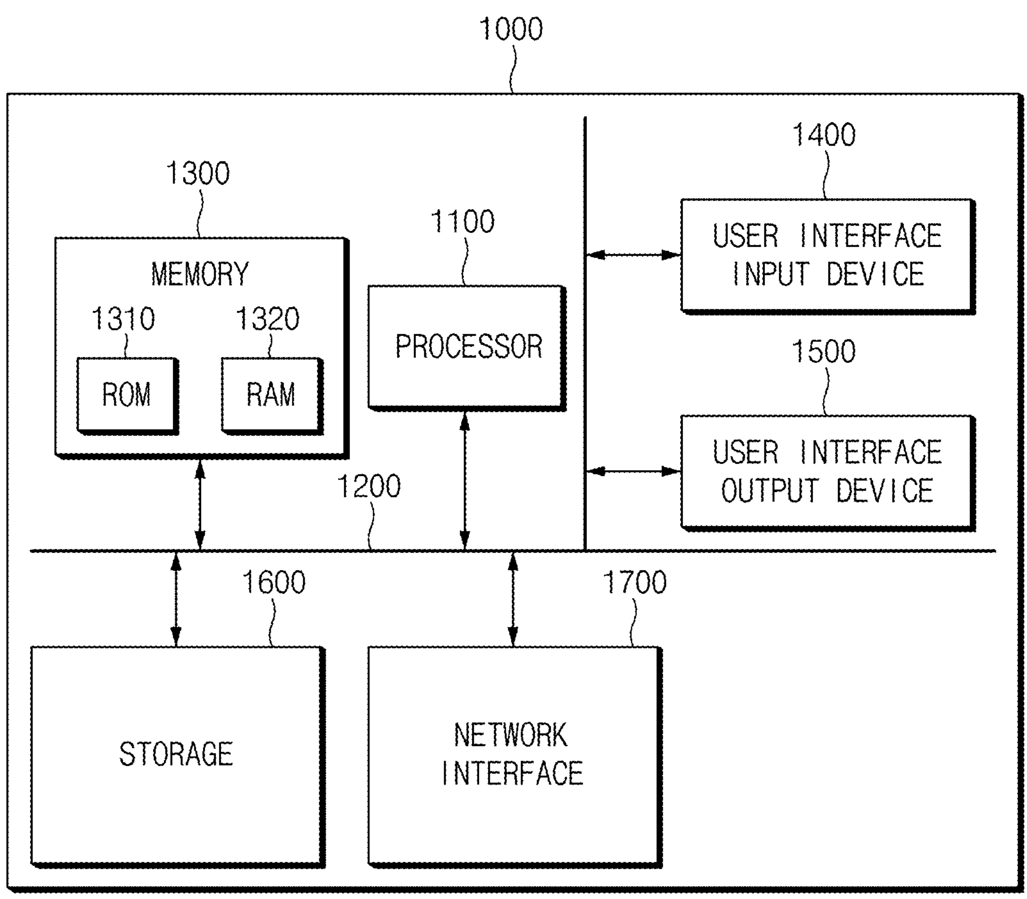
FIG. 6 illustrates a computing system for a seat control apparatus or a seat control method according to an embodiment of the present disclosure.

FIG. 6 illustrates a computing system for the seat control apparatus or the seat control method according to an embodiment of the present disclosure.

Referring to FIG. 6, a computing system 1000 regarding the seat control method may include at least one processor 1100, a memory 1300, a user interface input device 1400, a user interface output device 1500, a storage 1600, and a network interface 1700, which are connected through a bus 1200.

The processor 1100 may be a central processing unit (CPU), or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, a solid state drive (SSD), a detachable disk, or a CD-ROM.

The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The effects of the seat control apparatus and the seat control method according to the present disclosure are described as follows.

Embodiments of the present disclosure may provide a seat control apparatus that determines an operation sequence of the motors based on the output currents for the motors of the driving devices, which are required for controlling the seat to the target state corresponding to the specified input when receiving a specified input from the user.

Embodiments of the present disclosure may provide a seat control apparatus that, when identifying that a user is seated on a seat, identifies the output current by using the body information of the user and determines the operation sequence based on this.

Embodiments of the present disclosure may provide a seat control apparatus that identifies the required currents of the motors, and groups the motors into at one or more motor groups through comparison of the identified required currents and the available maximum output current that may be used by the seat control apparatus.

In embodiments of the present disclosure, in a process of controlling the first motor group identified as having the first priority in the operation sequence, once the operation of at least one motor included in the first motor group is completed, the seat control apparatus may efficiently and quickly control the seat to the target state by preferentially starting an operation of at least one motor included in another motor group having the next priority.

The technical effects of the present disclosure are not limited to the above-mentioned effects. Other effects that are not mentioned may become clearly understood by an ordinary person in the art, to which the present disclosure pertains, from the following description.

In addition, various effects that are directly or indirectly recognized through the specification may be provided.

The above description is a simple illustrative description of the technical spirit of the present disclosure. The present disclosure may be variously modified and altered by an ordinary person in the art, to which the present disclosure pertains, without departing from the essential characteristics of the present disclosure.

Therefore, the embodiments of the present disclosure are provided to explain the spirit and scope of the present disclosure and are not intended to limit the spirit and scope of the present disclosure. Thus, the spirit and scope of the present disclosure should not be limited by the embodiments. The scope of the present disclosure should be construed based on the accompanying claims. All the technical ideas within the scope equivalent to the claims should be included in the scope of the present disclosure.

What is claimed is:

1. A seat control apparatus comprising:

an input device;

a driving device;

a memory configured to store one or more instructions; and a controller operatively connected to the input device, the driving device, and the memory, wherein the controller is configured to execute the one or more instructions to:

receive a specified input regarding a location control of a seat through the input device;

identify an output current required for controlling the seat from a current state to a target state corresponding to the specified input by using the driving device;

determine an operation sequence of a plurality of motors included in the driving device, based on the output current; and control the seat to the target state by using the driving device, based on the determined operation sequence.

2. The seat control apparatus of claim 1, wherein the controller is further configured to execute the one or more instructions to:

identify required current of the plurality of motors, which are required for controlling the target state;

group the plurality of motors based on the required current; and sequentially control the grouped plurality of motors for respective groups, based on the operation sequence.

3. The seat control apparatus of claim 2, wherein the controller is further configured to execute the one or more instructions to:

identify a maximum current to be output, a first required current of a first motor, a second required current of a second motor group, or any combination thereof when an operation of the first motor included in a first motor group corresponding to a first priority is completed in a process of controlling the first motor group; and start controlling the second motor group in response to a determination that the second motor group is to be further controlled while the first motor group, except for the first motor, is controlled, based on the maximum current, the first required current, and the second required current.

4. The seat control apparatus of claim 3, wherein the controller is further configured to execute the one or more instructions to:

identify, among a plurality of motor groups, a motor group having a highest priority according to the operation sequence, as the second motor group.

5. The seat control apparatus of claim 3, wherein the controller is further configured to execute the one or more instructions to:

identify, among a plurality of motor groups, a motor group having a smallest movement amount, by which the seat is to be moved for controlling the target state, as the second motor group.

6. The seat control apparatus of claim 1, wherein the controller is further configured to execute the one or more instructions to:

identify a new output current corresponding to a passenger seating situation based on a weight of a user in response to a determination that the user is seated on the seat; and determine the operation sequence based on the new output current.

7. The seat control apparatus of claim 1, further comprising:

a sensor device, wherein the controller is further configured to execute the one or more instructions to:

identify biometric information of a user seated on the seat, by using the sensor device; and determine the operation sequence further based on the biometric information.

8. The seat control apparatus of claim 7, further comprising:

an output device, wherein the controller is further configured to execute the one or more instructions to:

determine the operation sequence to preferentially control, among the plurality of motors, a motor having a higher required current required for controlling the target state, in response to a determination that the user is sleeping, based on the biometric information.

9. A seat control method, comprising:

receiving, by a controller, a specified input regarding a location control of a seat through an input device;

identifying, by the controller, an output current required for controlling the seat from a current state to a target state corresponding to the specified input by using a driving device;

determining, by the controller, an operation sequence of a plurality of motors included in the driving device, based on the output current; and controlling the seat to the target state by using the driving device, based on the determined operation sequence.

10. The seat control method of claim 9, further comprising:

identifying, by the controller, required current of the plurality of motors, which are required for controlling the target state;

grouping, by the controller, the plurality of motors based on the required current; and sequentially controlling, by the controller, the grouped plurality of motors for respective groups, based on the operation sequence.

11. The seat control method of claim 10, further comprising:

identifying, by the controller, a maximum current to be output, a first required current of a first motor, a second required current of a second motor group, or any combination thereof when an operation of the first motor included in a first motor group corresponding to a first priority is completed in a process of controlling the first motor group; and starting, by the controller, controlling the second motor group in response to a determination that the second motor group is to be further controlled while the first motor group, except for the first motor, is controlled, based on the maximum current, the first required current, and the second required current.

12. The seat control method of claim 11, further comprising:

identifying, by the controller, among a plurality of motor groups, a motor group having a highest priority according to the operation sequence, as the second motor group.

13. The seat control method of claim 11, further comprising:

identifying, by the controller, among a plurality of motor groups, a motor group having a smallest movement amount, by which the seat is to be moved for controlling the target state, as the second motor group.

14. The seat control method of claim 11, further comprising:

identifying, by the controller, a new output current corresponding to a passenger seating situation based on a weight of a user in response to a determination that the user is seated on the seat; and determining, by the controller, the operation sequence based on the new output current.

15. The seat control method of claim 11, further comprising:

identifying, by the controller, biometric information of a user seated on the seat, by using a sensor device; and determining, by the controller, the operation sequence further based on the biometric information.

16. A computer readable recording medium, including a program for executing a seat control method, wherein the seat control method includes:

receiving, by a controller, a specified input regarding a location control of a seat through an input device;

identifying, by the controller, an output current required for controlling the seat from a current state to a target state corresponding to the specified input by using a driving device;

determining, by the controller, an operation sequence of a plurality of motors included in the driving device, based on the output current; and controlling, by the controller, the seat to the target state by using the driving device, based on the determined operation sequence.

17. The computer readable recording medium of claim 16, wherein the seat control method further includes:

identifying, by the controller, required current of the plurality of motors, which are required for controlling the target state;

grouping, by the controller, the plurality of motors based on the required current; and sequentially controlling, by the controller, the grouped plurality of motors for respective groups, based on the operation sequence.

18. The computer readable recording medium of claim 16, wherein the seat control method further includes:

identifying, by the controller, a maximum current to be output, a first required current of a first motor, a second required current of a second motor group, or any combination thereof when an operation of the first motor included in a first motor group corresponding to a first priority is completed in a process of controlling the first motor group; and starting, by the controller, controlling the second motor group in response to a determination that the second motor group is to be further controlled while the first motor group, except for the first motor, is controlled, based on the maximum current, the first required current, and the second required current.

19. The computer readable recording medium of claim 18, wherein the seat control method further includes:

identifying, by the controller, among a plurality of motor groups, a motor group having a highest priority according to the operation sequence, as the second motor group.

20. The computer readable recording medium of claim 18, wherein the seat control method further includes:

identifying, by the controller, among a plurality of motor groups, a motor group having a smallest movement amount, by which the seat is to be moved for controlling the target state, as the second motor group.

* * * * *